(12) United States Patent
Jang et al.

(10) Patent No.: US 7,836,912 B2
(45) Date of Patent: Nov. 23, 2010

(54) FUEL CARTRIDGE COUPLER FOR FUEL CELL

(75) Inventors: Won-Hyouk Jang, Suwon-si (KR);
Woong-Ho Cho, Suwon-si (KR);
Sang-Hyeon Choi, Suwon-si (KR);
Jong-Ki Lee, Suwon-si (KR);
Hyung-Keun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 872 days.

(21) Appl. No.: 11/797,625

(22) Filed: May 4, 2007

(65) Prior Publication Data
US 2007/0259246 A1 Nov. 8, 2007

(30) Foreign Application Priority Data
May 4, 2006 (KR) .................... 10-2006-0040677

(51) Int. Cl.
*H01M 2/02* (2006.01)
(52) U.S. Cl. ............................ 137/614.04; 137/614.03; 429/515
(58) Field of Classification Search ............... 137/614.06–614.05; 429/428, 515
See application file for complete search history.

(56) References Cited

U.S. PATENT DOCUMENTS 2,511,765 A * 6/1950 Bradbury ............... 137/614.03
3,294,118 A * 12/1966 Wieden et al. .......... 137/614.04
6,886,803 B2 * 5/2005 Mikiya et al. .......... 137/614.04
2003/0012985 A1 1/2003 McAlister
2004/0265652 A1 12/2004 Soucy
2005/0282048 A1 12/2005 Kamo
2008/0171258 A1 * 7/2008 Takahashi et al. ............ 429/35

FOREIGN PATENT DOCUMENTS

| JP | 2000-144464 | 5/2000 |
| JP | 2004-006351 | 1/2004 |
| WO | WO 2005/011036 | 2/2005 |
| WO | WO 2005/043660 | 5/2005 |

OTHER PUBLICATIONS

*Search Report* from the European Patent Office issued in Applicant's corresponding European Patent Application No. 07107481.9 dated Sep. 21, 2007.

* cited by examiner

*Primary Examiner*—Kevin L Lee
(74) *Attorney, Agent, or Firm*—Robert E. Bushnell, Esq.

(57) ABSTRACT

A fuel cartridge coupler to couple a cartridge body storing fuel to a fuel cell system, the fuel cartridge coupler including: a first coupling member arranged in the cartridge body; a second coupling member assembled with the first coupling member in the fuel cell system; a first nozzle assembly including a first fluid path to discharge fuel stored in the cartridge body, the fuel cartridge being elastically supported by the first coupling member and biased by the second coupling member to open and close the first fluid path; and a second nozzle assembly including a second fluid path to inject the fuel passing through the first fluid path into the fuel cell system, the second nozzle assembly being elastically supported by the second coupling member and biased by the first nozzle assembly to open and close the second fluid path.

32 Claims, 5 Drawing Sheets

FUEL CARTRIDGE COUPLER FOR FUEL CELL

CLAIM OF PRIORITY

This application makes reference to, incorporates the same herein, and claims all benefits accruing under 35 U.S.C. §119 from an application for FUEL CARTRIDGE COUPLING APPARATUS FOR FUEL CELL earlier filed in the Korean Intellectual Property Office on the 4$^{th}$ day of May 2006 and there duly assigned Serial No. 10-2006-0040677.

BACKGROUND OF THE INVENTION

1. Field of the Invention

The present invention relates to a fuel cartridge coupler for a fuel cell. More particularly, the present invention relates to a fuel cartridge coupler for mounting a fuel cartridge in a fuel cell system.

2. Description of the Related Art

Generally, a fuel cell system is an electrical power generating system for directly converting chemical reaction energy of a hydrocarbon material and an oxidant into electrical energy.

Fuel cell systems can be classified by whether they are Polymer Electrolyte Membrane Fuel Cells (PEMFCs) or Direct Oxidation Fuel Cells (DOFCs).

The PEMFC generates electrical energy through an electrochemical reaction between a reforming gas supplied from a reformer and an oxidant supplied by driving a pump or a fan.

The reformer receives a liquid fuel of a hydrocarbon material, such as methanol or ethanol, and reforms the liquid fuel to generate a reforming gas containing hydrogen as a main ingredient.

Unlike the PEMFC, the reforming gas is not used in the DOFC, but rather a liquid fuel is directly supplied from a fuel supply source so as to generate electrical energy on the basis of an electrochemical reaction between hydrogen contained in the fuel and the oxidant that is separately supplied.

In such a fuel cell system, the fuel supply source includes a fuel tank for storing the liquid fuel. This fuel tank is installed inside of a casing that defines the appearance of the system to supply the fuel to either the reformer or the DOFC.

Unfortunately, since the fuel tank is installed inside the casing of the fuel cell system, it cannot be easily exchanged and a recharging operation is difficult. Therefore, in view of the aforementioned problems, there is an urgent need to develop fuel cartridges that can be easily installed in the fuel cell system as well as exchanged in a convenient manner in order to commercialize the fuel cell system.

SUMMARY OF THE INVENTION

The invention provides a fuel cartridge coupler for a fuel cell which has a simple structure and can be easily installed in the fuel cell system.

According to an aspect of the invention, a fuel cartridge coupler to couple a cartridge body storing fuel to a fuel cell system is provided, the fuel cartridge coupler including: a first coupling member arranged in the cartridge body; a second coupling member assembled with the first coupling member in the fuel cell system; a first nozzle assembly including a first fluid path to discharge fuel stored in the cartridge body, the fuel cartridge being elastically supported by the first coupling member and biased by the second coupling member to open and close the first fluid path; and a second nozzle assembly including a second fluid path to inject fuel passing through the first fluid path into the fuel cell system, the second nozzle assembly being elastically supported by the second coupling member and biased by the first nozzle assembly to open and close the second fluid path.

The first coupling member preferably includes a first receptacle to support the first nozzle assembly and a second receptacle to support the second coupling member. The first coupling member preferably includes a first combining hole arranged in the first receptacle, the first combining hole arranged to allow the first nozzle assembly to pass therethrough. The first coupling member preferably has a cylindrical shape, and an inside diameter of the second receptacle is larger than that of the first receptacle.

An inside diameter of the first receptacle is preferably larger than that of the first coupling hole.

The first coupling member preferably has a step to divide the first and second receptacles.

The first nozzle assembly preferably includes: a first nozzle body inserted into the first coupling member to penetrate the first coupling member; and a first elastic member supportably mounted in the first coupling member and the first nozzle body to exert an elastic force on the first nozzle body. The first nozzle assembly preferably includes: a first nozzle body arranged in the first receptacle and passing through the first combining hole; and a second elastic member supportably mounted in the first coupling member and the first nozzle body to exert an elastic force on the first nozzle body.

The first nozzle body preferably includes a first portion having an outer diameter larger than an inner diameter of the first combining hole and a second portion connected to the first portion in a single body and passing through the first combining hole.

The first fluid path is preferably arranged within an inside area of the first nozzle body and includes at least a first orifice arranged in the second portion and a second orifice arranged in the first portion.

An inside diameter of the second orifice is preferably larger than that of the first orifice. The first orifice is preferably selectively opened and closed by biasing the first nozzle body with the second coupling member.

The first nozzle assembly preferably includes a stopper arranged in the first nozzle body to prevent the first nozzle body from being removed from the first coupling member. The first nozzle assembly preferably includes an O-ring arranged in the second portion of the first nozzle body to prevent the first nozzle body from being removed from the first coupling member through the first combining hole.

The second coupling member preferably includes a third receptacle to support the second nozzle assembly. The second coupling member preferably includes a second combining hole arranged in the third receptacle to allow the second nozzle assembly to pass therethrough. The second coupling member preferably has a cylindrical shape, and an inside diameter of the third receptacle is larger than that of the second combining hole. The second coupling member is preferably inserted into the second receptacle of the first coupling member to bias the first nozzle assembly. The second coupling member preferably includes at least one O-ring arranged on an outer circumference of the second coupling member.

The second nozzle assembly preferably includes: a second nozzle body inserted into the second coupling member and penetrating the second coupling member; and a second elastic member supportably mounted in the second coupling member and the second nozzle body to exert an elastic force on the second nozzle body. The second nozzle assembly preferably includes: a second nozzle body inserted into the second coupling member and penetrating the second coupling member; and a second elastic member supportably mounted in the second coupling member and the second nozzle body to exert an elastic force on the second nozzle body, the second elastic member including a spring exerting an elastic force smaller than that of the first elastic member. The second nozzle assembly preferably includes: a second nozzle body arranged in the third receptacle and passing through the second combining hole; and a second elastic member supportably mounted in the second coupling member and the second nozzle body to exert an elastic force on the second nozzle body. The second nozzle body preferably includes a first portion having an outer diameter larger than an inner diameter of the second combining hole and a second portion connected to the first portion in a single body and passing through the second combining hole, the second nozzle body being biased by the first nozzle assembly.

The second fluid path is preferably arranged within an inside area of the second nozzle body and includes at least a first orifice arranged in the second portion and a second orifice arranged in the first portion. An inside diameter of the second orifice is preferably larger than that of the first orifice. The first orifice is preferably selectively opened and closed by biasing the second nozzle body with the first nozzle assembly.

The second nozzle assembly preferably includes a stopper arranged in the second nozzle body to prevent the second nozzle body from being removed from the second coupling member. The second nozzle assembly preferably includes an O-ring arranged in the second portion of the second nozzle body to prevent the second nozzle body from being removed from the second combining hole.

The first coupling member preferably includes a step to divide the first and second receptacles and a first inclined face arranged in an interconnected portion between the first receptacle and the step. The first coupling member preferably includes a second inclined face having a tapered shape and arranged in an opening of the second receptacle.

The second coupling member preferably includes a third inclined face having a tapered shape and arranged in an opening of the third receptacle.

An inner wall surface of the second receptacle is preferably sloped such that an inside diameter of the second receptacle is reduced in a direction toward the first receptacle.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE EMBODIMENTS

Now, embodiments of the present invention will be described with reference to the accompanying drawings in detail so as to be easily implemented by those of ordinary skill in the art.

Figure 1:
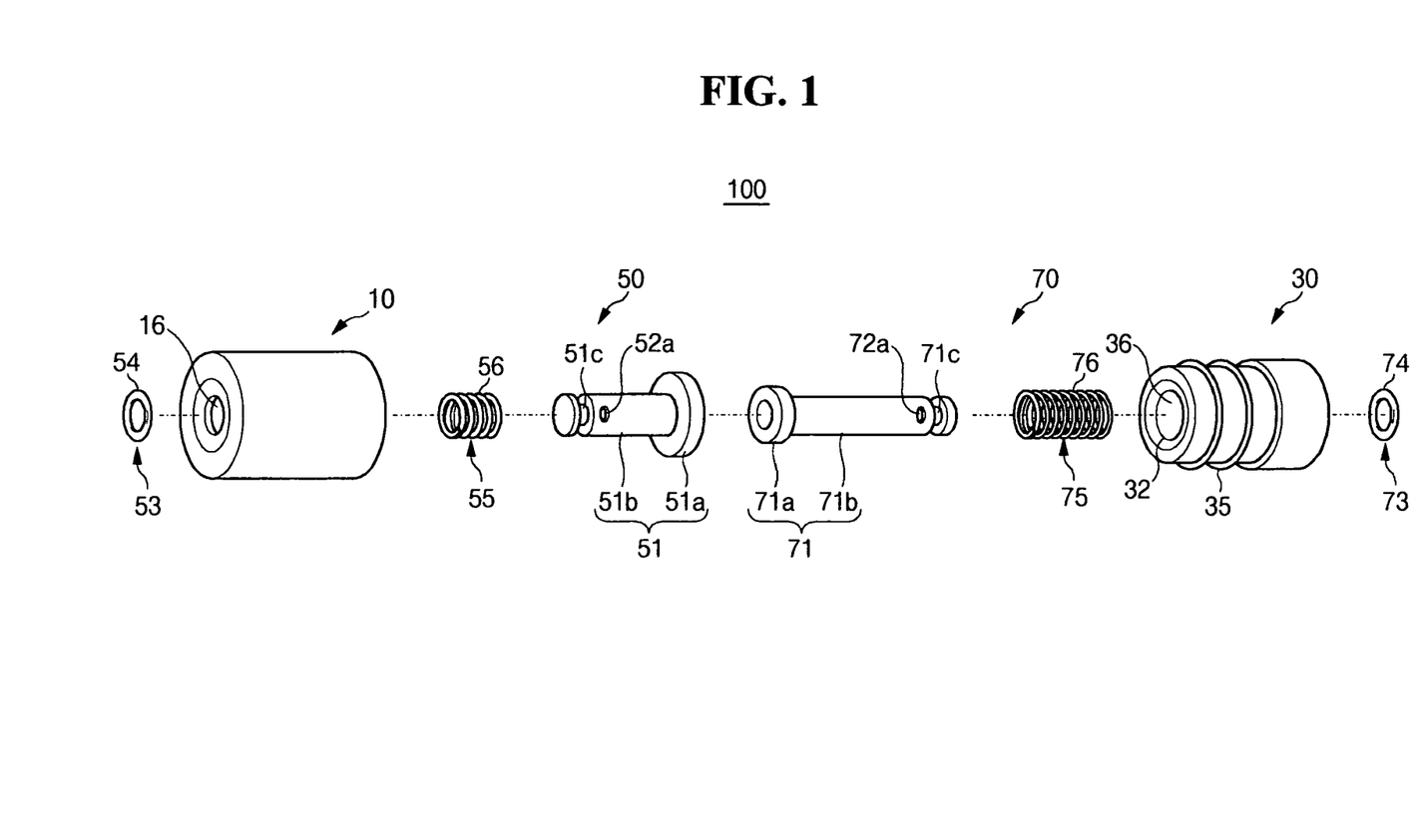
FIG. 1 is an exploded perspective view of a fuel cartridge coupler for a fuel cell according to an exemplary embodiment of the present invention.
Figure 2:
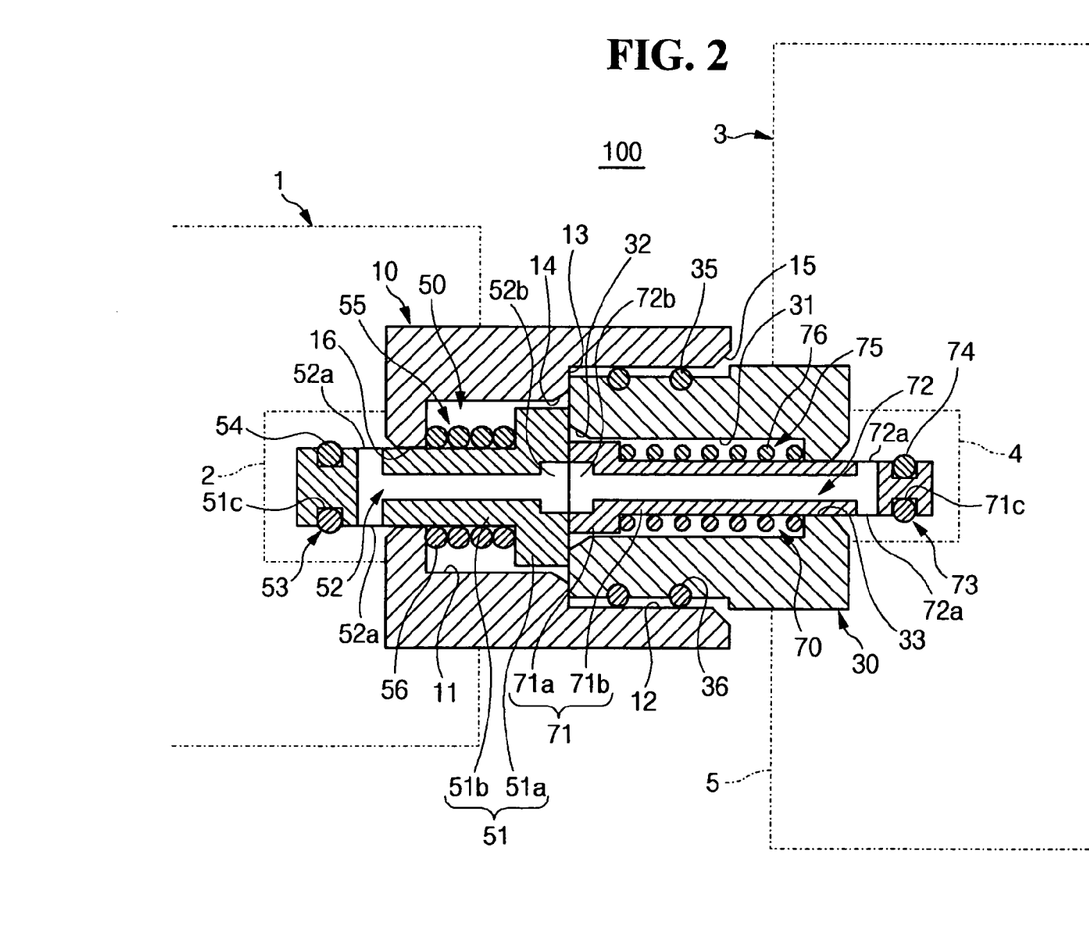
FIG. 2 is a combined cross-sectional view of FIG. 1.

FIG. 1 is an exploded perspective view of a fuel cartridge coupler for a fuel cell according to an exemplary embodiment of the present invention, and FIG. 2 is a combined cross-sectional view of FIG. 1.

Referring to FIGS. 1 and 2, the fuel cartridge coupler 100 according to the present embodiment is provided to install a cartridge body 1 for storing fuel in a fuel cell system 3.

The fuel cartridge coupler 100 is installed to combine the cartridge body 1 with the fuel cell system 3, and has a selectively detachable structure for attaching and detaching the cartridge body 1 to the fuel cell system 3.

The cartridge body 1 has a space for storing the fuel and has a manifold 2 communicated to that storage space. The manifold 2 functions as a fuel outlet for discharging the fuel stored in the storage space.

The fuel cell system 3 can be applied to both Polymer Electrolyte Membrane Fuel Cells (PEMFCs) and Direct Oxidation Fuel Cells (DOFCs).

A PEMFC includes a reformer (not shown) that reforms the fuel to generate a reforming gas composed of hydrogen as a main component and a fuel cell body (not shown) that generates electrical energy on the basis of an electrochemical reaction between a reforming gas and an oxidant.

Unlike the PEMC, the DOFC does not require the reformer but has a fuel cell body (not shown) that directly receives the fuel and generates electrical energy on the basis of the electrochemical reaction between the fuel and oxidant.

The fuel cell system 3 may include a manifold 4 connected to the reformer or the direct oxidation fuel cell body inside a casing 5 that defines the appearance of the system. The manifold functions as a fuel inlet that is interconnected with the reformer or in the direction of the oxidation fuel cell body to inject the fuel supplied from the cartridge body 1 to the reformer or the direct oxidation fuel cell body.

The aforementioned fuel cartridge coupler 100 for a fuel cell includes a first coupling member 10 installed in the cartridge body 1, a second coupling member 30 installed in the fuel cell system 3, a first nozzle assembly 50 elastically installed in the first coupling member 10, and a second nozzle assembly 70 elastically installed in the second coupling member 30.

The first coupling member 10 has a cylindrical shape, and is installed in the cartridge body 1 in a forcible fitting method or a screw-combining method so as to be connected to the manifold 2 of the cartridge body 1.

The first coupling member 10 includes a first receptacle 11 for supporting the first nozzle assembly 50 and a second receptacle 12 for supporting the second coupling member 30.

The first receptacle 11 has a circular groove shape with a predetermined inside diameter in the first coupling member 10. The second receptacle 12 is connected to the first receptacle 11 and is stepped toward one end of the first coupling member 10. The second receptacle 12 has a relatively larger inside diameter than that of the first receptacle 11, and has a circular groove shape for providing an opening in one end of the first coupling member 10.

As described above, since the second receptacle 12 has an inside diameter larger than that of the first receptacle 11 and is connected to the first receptacle 11, the first and second receptacles 11 and 12 are interconnected through a step 13 that substantially divides them.

In the present embodiment, a first inclined face 14 having a tapered shape is provided between the first receptacle 11 and the step 13. Furthermore, a second inclined face 15 having a tapered shape is provided in an opening of the second receptacle 12.

The first and second inclined faces 14 and 15 are provided in consideration of a mechanical machining margin for the first nozzle assembly 50 and the second coupling member 30 in order to allow the first nozzle assembly 50 and the second coupling member 30 to be easily combined with the first coupling member 10.

The first coupling member 10 has a first combining hole 16 formed in the first receptacle 11. The first combining hole 16 is formed to have an opening in the other end of the first coupling member 10 where the manifold 2 is connected, and has an inside diameter relatively smaller than that of the first receptacle 11. The first combining hole 16 is a circular hole where the first nozzle assembly 50, which will be described later in detail, passes through.

In the present embodiment, the second coupling member 30 has a cylindrical shape and is installed in the casing 5 of the fuel cell system 3 in a forcible fitting method or a screw-combining method. Also, the second coupling member 30 is connected to the manifold 4 of the fuel cell system 3.

The second coupling member 30 is inserted into the second receptacle 12 of the first coupling member 10 as a male-and-female connection, and has a plurality of O-rings 35 in its outer circumferential surface.

Each O-ring 35 is fitted into a combining trench 36 formed in an outer circumference of the second coupling member 30. The O-ring 35 has not only a function of holding the second coupling member 30 with respect to the first coupling member 10 but also a function of sealing between an inner circumference of the second receptacle 12 and an outer circumference of the second coupling member 30.

The second coupling member 30 includes a third receptacle 31 for supporting the second nozzle assembly 70. The third receptacle 31 is an area where the second nozzle assembly 70 is inserted, and has a circular groove shape having an opening in one end of the second coupling member 30.

The opening of the third receptacle 31 has a third inclined face 32 having a tapered shape. The third inclined face 32 is provided in consideration of a mechanical machining margin for the second nozzle assembly 70 to allow the second nozzle assembly 70 to be easily fitted into the second coupling member 30.

The second coupling member 30 has a second combining hole 33 formed in the third receptacle 31. The second combining hole 33 is openably formed in the other end of the second coupling member 30 connected to the manifold 4, and has an inside diameter relatively smaller than that of the third receptacle 31. The second combining hole 33 is a circular hole where the second nozzle assembly 70, which will be described later in detail, passes through.

In the present embodiment, the first nozzle assembly 50 is provided to discharge the fuel stored in the cartridge body 1, and is elastically supported by the first coupling member 10.

The first nozzle assembly 50 includes a first nozzle body 51 that is inserted into and penetrates the first coupling member 10, and a first elastic member 55 supported by the first coupling member 10 and the first nozzle body 51.

The first nozzle body 51 is arranged inside the first receptacle 11 of the first coupling member 10, and is inserted through the first combining hole 16 of the first coupling member 10. The first nozzle body 51 has a first fluid path 52 for discharging the fuel stored in the cartridge body 1.

The first nozzle body 51 includes a first portion 51a that has a disk shape having an outer diameter larger than the inner diameter of the first combining hole 16, and a second portion 51b that is connected to the first portion 51a in a single body and has a bar shape passing through the first combining hole 16.

In the second portion 51b, an end of the first portion 51a is inserted into the manifold 2 of the cartridge body 1 through the first combining hole 16 of the first combining member 10.

In the present embodiment, the first fluid path 52 is formed inside the first nozzle body 51. The first fluid path 52 includes a pair of first orifices 52a formed in the second portion 51b and a second orifice 52b formed in the first portion 51a of the first nozzle body 51 to provide a path interconnected between the pair of first orifices 52a and the second orifice 52b.

The first fluid path 52 is elongated along a longitudinal direction of the second portion 51b and interconnected with the second orifice 52b. Also, an end of the first fluid path 52 is vertically divided with respect to the longitudinal direction of the second portion 51b and interconnected with the pair of first orifices 52a. In this case, the second orifice 52b of the first fluid path 52 has an inside diameter larger than that of the first orifice 52a.

The first nozzle assembly 50 is provided with a stopper 53 mounted in the second portion 51b of the first nozzle body 51. The stopper 53 prevents the first nozzle body 51 from being removed from the first coupling member 10 through the first combining hole 16.

The stopper 53 includes an O-ring 54 mounted in an end of the second portion 51b that is to be combined with the manifold 2 of the cartridge body 1 through the first combining hole 16. The O-ring 54 is inserted in a combining groove 51c formed in an end of the second portion 51b and sticks in the circumference of the first combining hole 16 so as to prevent the first nozzle body 51 from being removed from the first coupling member 10 through the first combining hole 16.

The first elastic member 55 provides a predetermined elastic force to the first nozzle body 51 and is arranged inside the first receptacle 11 of the first coupling member 10.

The first elastic member 55 includes a first coil spring 56 that winds the second portion 51b of the first nozzle body 51. While its one end is supported by the circumference of the first combining hole 16, the other end is supported by the first portion 51a of the first nozzle body 51.

Figure 3A:
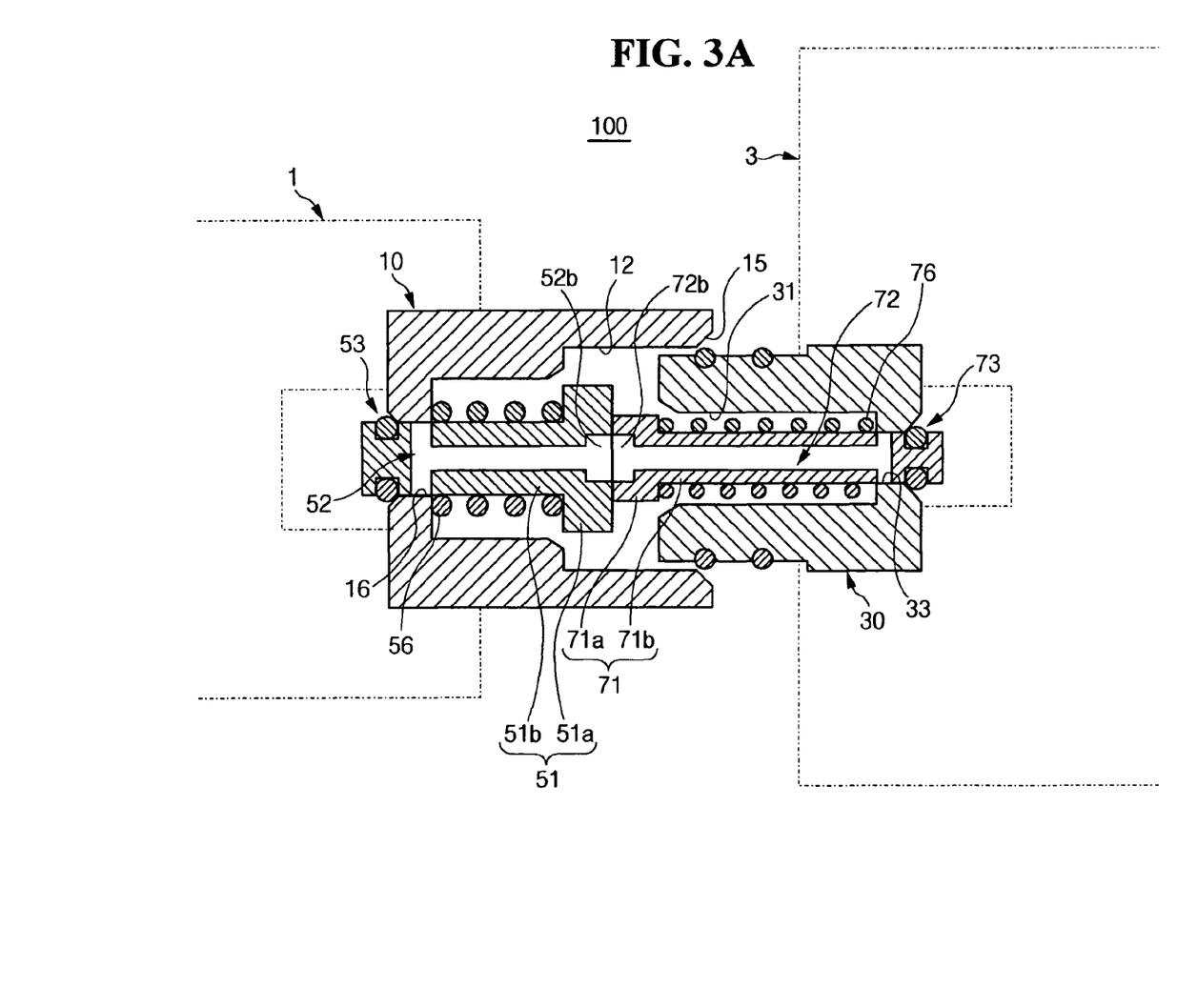
FIGS. 3A and 3B are cross-sectional views for describing functions of a fuel cartridge coupler for a fuel cell according to an exemplary embodiment of the present invention.

Since the first nozzle body 51 has a stopper 53 in an end of the second portion 51b, and the stopper 53 is stuck in the circumference of the first combining hole 16 as shown in FIG. 3A even when an elastic force is exerted from the first elastic member 55, the first nozzle body 51 is not removed from the first coupling member 10 through the first combining hole 16 but is elastically supported by the first coupling member 10.

In the present embodiment, the second nozzle assembly 70 is provided to inject the fuel discharged from the cartridge body 1 through the first fluid path 52 of the first nozzle assembly 50 into the reformer of the fuel cell system 3 or the direct oxidation fuel cell body. In addition, the second nozzle assembly 70 is elastically supported by the second coupling member 30.

The second nozzle assembly 70 includes a second nozzle body 71 that is inserted into and penetrates the second coupling member 30 and a second elastic member 75 supported by the second coupling member 30 and the second nozzle body 71.

The second nozzle body 71 is arranged in an inside area of the third receptacle 31 of the second coupling member 30, and passes through the second combining hole 33 of the second coupling member 30. The second nozzle body 71 includes a second fluid path 72 for injecting the fuel discharged from the cartridge body 1 through the first fluid path 52 of the first nozzle assembly 50 into the reformer of the fuel cell system 3 or the direct oxidation fuel cell body.

The second nozzle body 71 includes a first portion 71a that has a disk shape having an outer diameter larger than the inner diameter of the second combining hole 33, and a second portion 71b that has a bar shape connected to the first portion 71a in a single body and passes through the second combining hole 33.

In the second portion 71b, an end of the first portion 71a passes through the second combining hole 33 of the second coupling member 30 and is arranged inside the manifold 4 of the fuel cell system 3. The first portion 71a of the second nozzle body 71 makes contact with the first portion 51a of the first nozzle body 51 when the first and second coupling members 10 and 30 are combined with each other. The first portion 71a of the second nozzle body 71 has an outer diameter larger than that of the first portion 51a of the first nozzle body 51.

In the present embodiment, the second fluid path 72 is provided inside the second nozzle body 71. The second fluid path 72 includes a pair of first orifices 72a formed in the second portion 71b and a second orifice 72b formed in the first portion of the second nozzle body 71, so that the pair of first orifices 72a and the second orifice 72b are interconnected with each other.

The second fluid path 72 is elongated along a longitudinal direction of the second portion 71b and interconnected to the second orifice 72b. Also, an end of the second fluid path 72 is vertically divided with respect to the longitudinal direction of the second portion 71b and is interconnected with the pair of first orifices 72a. In this case, the second orifice 72b of the second fluid path 72 has an inside diameter larger than that of the first orifice 72a and equal to that of the second orifice 52b of the first fluid path 52.

The second nozzle assembly 70 is provided with a stopper 73 mounted in the second portion 71b of the second nozzle body 71. The stopper 73 prevents the first nozzle body 71 from being removed from the second coupling member 30 through the second combining hole 33.

The stopper 73 includes an O-ring 74 mounted in an end of the second portion 71b that is to be combined with the manifold 4 of the fuel cell system 3 through the second combining hole 33. The O-ring 74 is inserted in the combining groove 71c formed in an end of the second portion 71b and sticks in the circumference of the first combining hole 33 so as to prevent the second nozzle body 71 from being removed from the second coupling member 30 through the second combining hole 33.

The second elastic member 75 provides a predetermined elastic force to the second nozzle body 71, and is arranged inside the third receptacle 31 of the second coupling member 30. The second elastic member 75 includes a second coil spring 76 that winds the second portion 71b of the second nozzle body 71. While its one end is supported by the circumference of the second combining hole 33, the other end is supported by the first portion 71a of the second nozzle body 71.

Since the second nozzle body 71 has a stopper 53 in an end of the second portion 71b, and the stopper 53 is stuck in the circumference of the second combining hole 33 as shown in FIG. 3A even when an elastic force is exerted from the second elastic member 75, the second nozzle body 71 is not removed from the second coupling member 30 through the second combining hole 33 and is elastically supported by the second coupling member 30.

In the present embodiment, preferably, the second coil spring 76 supports the second nozzle body 71 with an elastic force smaller than that of the first coil spring 56 of the first nozzle assembly 50. This is preferable in order to bias the second nozzle body 71 to the first nozzle body 51 while the first portion 71a of the second nozzle body 71 fays to the first portion 51a of the first nozzle body 51 to assemble the first and second coupling members 10 and 30 with each other.

The operation of the fuel cartridge coupler for a fuel cell having the aforementioned structure according to an exemplary embodiment of the present invention is described in detail below.

As shown in FIG. 3A, the first nozzle body 51 is elastically supported by the first coupling member 10 by means of the first coil spring 56.

In the first nozzle body 51, an end of the second portion 51b is intruded to the first combining hole 16 as an elastic force of the first coil spring 56 is exerted toward the second receptacle 12 of the first coupling member 10.

The first nozzle body 51 is not removed from the first coupling member 10 through the first combining hole 16 while the stopper 53 is stuck in the circumference of the first combining hole 16.

The first orifice 52a (shown in FIG. 2) of the first fluid path 52 is closed by the inner circumference of the first combining hole 16 as an end of the second portion 51b of the first nozzle body 51 is intruded into the first combining hole 16. The first portion 51a of the first nozzle body 51 is located at an inside space of the second receptacle 12.

The second nozzle body 71 is elastically supported by the second coupling member 30 by means of the second coil spring 76. In the second nozzle body 71, an end of the second portion 71b is intruded into the second combining hole 33 as an elastic force of the second coil spring 76 is exerted toward an opening of the third receptacle 31. Therefore, the second nozzle body 71 is not removed from the second coupling member 30 through the second combining hole 33 as the stopper 73 is stuck in the circumference of the second combining hole 33.

The first orifice 72a (shown in FIG. 2) of the second fluid path 72 is closed by the inner circumference of the second combining hole 33 as an end of the second portion 71b of the second nozzle body 71 is intruded into the second combining hole 33. The first portion 71a of the second nozzle body 71 is outwardly protruded from the opening of the third receptacle 31.

In this state, the second coupling member 30 is inserted into the second receptacle 12 of the first coupling member 10 in order to install the cartridge body 1 in the fuel cell system 3.

The second coupling member 30 can be easily inserted into the second receptacle 12 in spite of a mechanical machining margin due to the second inclined face 15 having a tapered shape in an opening of the second receptacle 12 of the first coupling member 10.

In this process, the first portion 71a of the second nozzle body 71 fays to the first portion 51a of the first nozzle body 51. Simultaneously, the second orifice 72b of the second fluid path 72 is interconnected with the second orifice 52b of the first fluid path 52 of the first nozzle body 51.

In this case, since the second orifice 52b of the first fluid path 52 and the second orifice 72b of the second fluid path 72 have an inside diameter larger than that of the first orifices 52a (shown in FIG. 2), a path for interconnecting the first orifices 51a and 72b can be easily provided in spite of a mechanical machining margin in the first and second nozzle bodies 51 and 71.

Figure 3B:
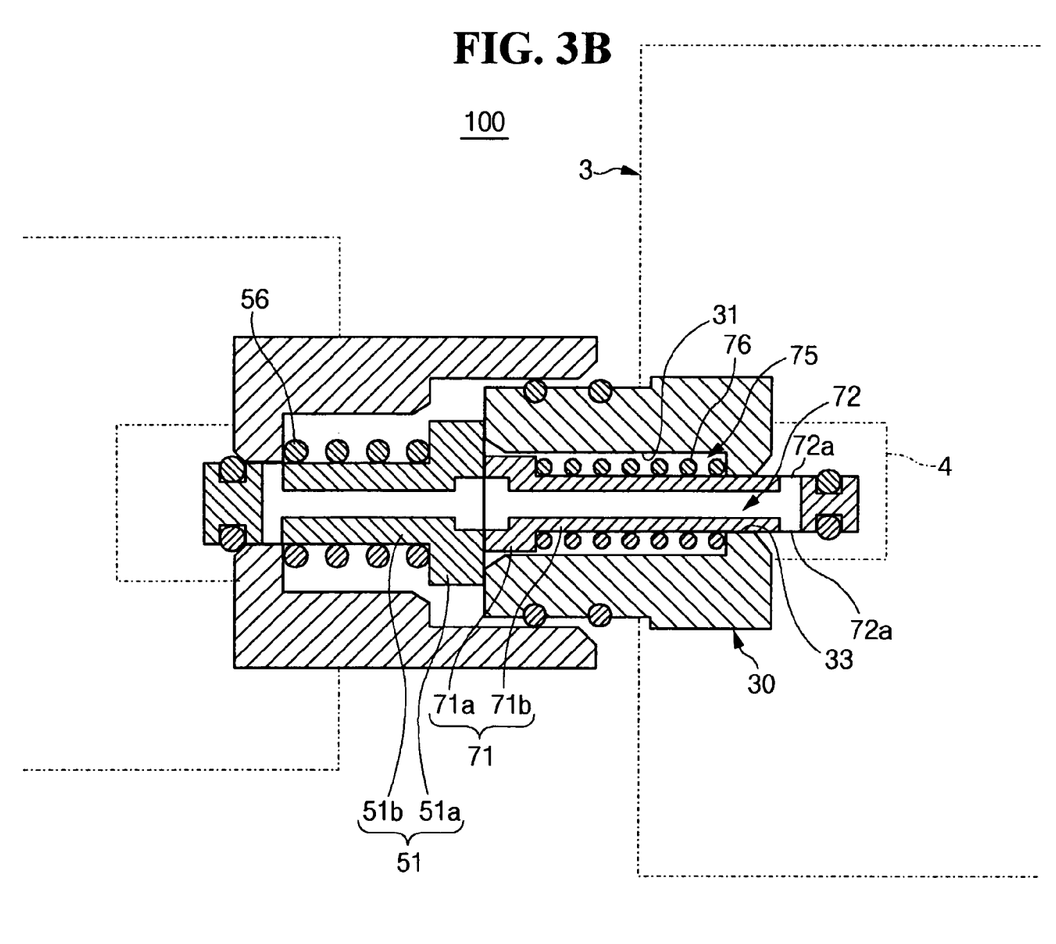

Subsequently, since the elastic force of the second coil spring is smaller than that of the first coil spring 56 as shown in FIG. 3B, the second nozzle body 71 moves opposite to the insertion direction of the second coupling member 30 against the elastic force of the second coil spring 76 by the thickness of the first portion 71a. As a result, the first portion 71a of the second nozzle body 71 is located at an inside area of the third receptacle 31 of the second coupling member 30.

Accordingly, the first orifice 72a of the second fluid path 72 is interconnected with the manifold 4 of the fuel cell system 3 as an end of the second portion 71b of the second nozzle body 71 is protruded from the second combining hole 33 by the thickness of the first portion 71a.

While the first orifice 72a of the second fluid path 72 is opened as described above, the second coupling member 30 fays to the first portion 51a of the first nozzle body 51.

Subsequently, the first nozzle body 51 is pressed by the second coupling member 30 as shown in FIG. 2 and moves opposite to the insertion direction of the second coupling member 30 against the elastic force of the first coil spring 56 by the thickness of the first portion 51a.

The insertion of the second coupling member 30 stops by the step 13 of the first coupling member 10. As a result, the first portion 51a of the first nozzle body 51 is located in an inside area of the first receptacle 11 of the first coupling member 10.

The first orifice 52a of the first fluid path 51 is interconnected with the manifold 2 of the cartridge body 1 as an end of the second portion 51b of the first nozzle body 51 is protruded from the first combining hole 16 by the thickness of the first portion 51a.

Accordingly, in the present embodiment, the first fluid path 52 of the first nozzle body 51 is interconnected with the manifold 2 of the cartridge body 1, and the second fluid path 72 of the second nozzle body 71 is interconnected with the manifold 4 of the fuel cell system 3. As a result, the first and second fluid paths 51 and 72 constitute a single path.

Accordingly, the fuel stored in the cartridge body 1 can be supplied to the reformer of the fuel cell system 3 or the direct oxidation fuel cell body through the first and second fluid paths 51 and 72.

Figure 4:
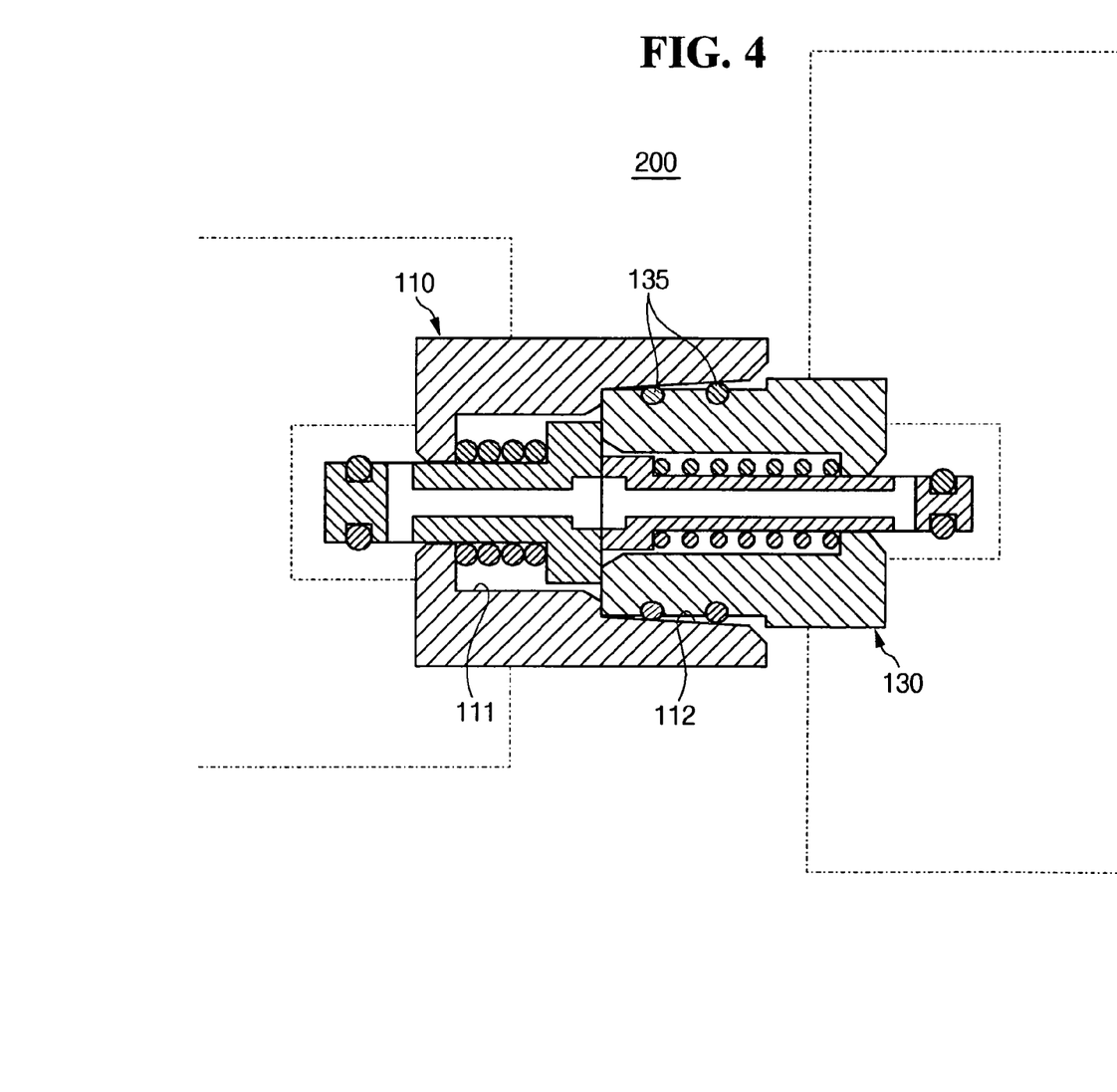
FIG. 4 is a combined cross-sectional view of a fuel cartridge coupler for a fuel cell according to another exemplary embodiment of the present invention.

FIG. 4 is a combined cross-sectional view illustrating a fuel cartridge coupler for a fuel cell according to another embodiment of the present invention.

Referring to FIG. 4, the fuel cartridge coupler 200 according to the present embodiment includes a first coupling member 110 having a second receptacle 112 of which an inner wall surface is sloped toward a first receptacle 111.

In the present embodiment, the inner wall surface of the second receptacle 112 is sloped such that its inside diameter is reduced from the opening to the first receptacle. The slope in the inner wall surface allows the second coupling member 130 inserted into the second receptacle 112 to be smoothly guided toward the first receptacle 111.

According to the present embodiment, since the inner wall surface of the second receptacle 112 is sloped when the second coupling member 130 is inserted into the second receptacle 112 of the first coupling member 110, the O-ring 135 mounted in the second coupling member 130 is pressed by the inner wall surface so that a mechanical machining margin of the O-ring 135 of can be compensated for. The mechanical machining margin of the O-ring 135 refers to errors in machining dimensions or machining strengths.

In addition, according to the present embodiment, since the second coupling member 130 is guided along the inner wall surface of the second receptacle 112 and inserted into the second receptacle 112, it is possible to compensate for the mechanical machining margins of the first and second coupling members 110 and 130.

Other constructions and functions of the fuel cartridge coupler 200 for a fuel cell according to the present embodiment are similar to those of the former embodiment, so they will not be described.

According to the present embodiment, since the cartridge body can be conveniently installed in the fuel cell system, it is possible to conveniently exchange the fuel cartridge and conveniently charge the fuel. Therefore, the infrastructure of the fuel cartridge can be constructed, and usability and reliability of the fuel cell system can be further improved.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A fuel cartridge coupler to couple a cartridge body storing fuel to a fuel cell system, the fuel cartridge coupler comprising:
    a first coupling member arranged in the cartridge body;
    a second coupling member assembled with the first coupling member in the fuel cell system;
    a first nozzle assembly including a first fluid path to discharge fuel stored in the cartridge body, the fuel cartridge being elastically supported by the first coupling member and biased by the second coupling member to open and close the first fluid path; and
    a second nozzle assembly including a second fluid path to inject fuel passing through the first fluid path into the fuel cell system, the second nozzle assembly being elastically supported by the second coupling member and biased by the first nozzle assembly to open and close the second fluid path.

2. The fuel cartridge coupler of claim 1, wherein the first coupling member comprises a first receptacle to support the first nozzle assembly and a second receptacle to support the second coupling member.

3. The fuel cartridge coupler of claim 2, wherein the first coupling member comprises a first combining hole arranged in the first receptacle, the first combining hole arranged to allow the first nozzle assembly to pass therethrough.

4. The fuel cartridge coupler of claim 3, wherein the first coupling member has a cylindrical shape, and wherein an inside diameter of the second receptacle is larger than that of the first receptacle.

5. The fuel cartridge coupler of claim 3, wherein an inside diameter of the first receptacle is larger than that of the first combining hole.

6. The fuel cartridge coupler of claim 4, wherein the first coupling member has a step to divide the first and second receptacles.

7. The fuel cartridge coupler of claim 1, wherein the first nozzle assembly comprises:
    a first nozzle body inserted into the first coupling member to penetrate the first coupling member; and a first elastic member supportably mounted in the first coupling member and the first nozzle body to exert an elastic force on the first nozzle body.

8. The fuel cartridge coupler of claim 3, wherein the first nozzle assembly comprises:
a first nozzle body arranged in the first receptacle and passing through the first combining hole; and
a second elastic member supportably mounted in the first coupling member and the first nozzle body to exert an elastic force on the first nozzle body.

9. The fuel cartridge coupler of claim 8, wherein the first nozzle body comprises a first portion having an outer diameter larger than an inner diameter of the first combining hole and a second portion connected to the first portion in a single body and passing through the first combining hole.

10. The fuel cartridge couple of claim 9, wherein the first fluid path is arranged within an inside area of the first nozzle body and includes at least a first orifice arranged in the second portion and a second orifice arranged in the first portion.

11. The fuel cartridge coupler of claim 10, wherein an inside diameter of the second orifice is larger than that of the first orifice.

12. The fuel cartridge coupler of claim 10, wherein the first orifice is selectively opened and closed by biasing the first nozzle body with the second coupling member.

13. The fuel cartridge coupler of claim 7, wherein the first nozzle assembly comprises a stopper arranged in the first nozzle body to prevent the first nozzle body from being removed from the first coupling member.

14. The fuel cartridge couple of claim 8, wherein the first nozzle assembly comprises an O-ring arranged in the second portion of the first nozzle body to prevent the first nozzle body from being removed from the first coupling member through the first combining hole.

15. The fuel cartridge coupler of claim 2, wherein the second coupling member comprises a third receptacle to support the second nozzle assembly.

16. The fuel cartridge coupler of claim 15, wherein the second coupling member comprises a second combining hole arranged in the third receptacle to allow the second nozzle assembly to pass therethrough.

17. The fuel cartridge coupler of claim 16, wherein the second coupling member has a cylindrical shape, and wherein an inside diameter of the third receptacle is larger than that of the second combining hole.

18. The fuel cartridge coupler of claim 2, wherein the second coupling member is inserted into the second receptacle of the first coupling member to bias the first nozzle assembly.

19. The fuel cartridge coupler of claim 1, wherein the second coupling member comprises at least one O-ring arranged on an outer circumference of the second coupling member.

20. The fuel cartridge coupler of claim 1, wherein the second nozzle assembly comprises:
a second nozzle body inserted into the second coupling member and penetrating the second coupling member; and
a second elastic member supportably mounted in the second coupling member and the second nozzle body to exert an elastic force on the second nozzle body.

21. The fuel cartridge coupler of claim 7, wherein the second nozzle assembly comprises:
a second nozzle body inserted into the second coupling member and penetrating the second coupling member; and
a second elastic member supportably mounted in the second coupling member and the second nozzle body to exert an elastic force on the second nozzle body, the second elastic member including a spring exerting an elastic force smaller than that of the first elastic member.

22. The fuel cartridge coupler of claim 16, wherein the second nozzle assembly comprises:
a second nozzle body arranged in the third receptacle and passing through the second combining hole; and
a second elastic member supportably mounted in the second coupling member and the second nozzle body to exert an elastic force on the second nozzle body.

23. The fuel cartridge coupler of claim 22, wherein the second nozzle body comprises a first portion having an outer diameter larger than an inner diameter of the second combining hole and a second portion connected to the first portion in a single body and passing through the second combining hole, the second nozzle body being biased by the first nozzle assembly.

24. The fuel cartridge coupler of claim 23, wherein the second fluid path is arranged within an inside area of the second nozzle body and includes at least a first orifice arranged in the second portion and a second orifice arranged in the first portion.

25. The fuel cartridge coupler of claim 24, wherein an inside diameter of the second orifice is larger than that of the first orifice.

26. The fuel cartridge coupler of claim 24, wherein the first orifice is selectively opened and closed by biasing the second nozzle body with the first nozzle assembly.

27. The fuel cartridge coupler of claim 20, wherein the second nozzle assembly comprises a stopper arranged in the second nozzle body to prevent the second nozzle body from being removed from the second coupling member.

28. The fuel cartridge coupler of claim 22, wherein the second nozzle assembly comprises an O-ring arranged in the second portion of the second nozzle body to prevent the second nozzle body from being removed from the second combining hole.

29. The fuel cartridge coupler of claim 2, wherein the first coupling member comprises a step to divide the first and second receptacles and a first inclined face arranged in an interconnected portion between the first receptacle and the step.

30. The fuel cartridge coupler of claim 29, wherein the first coupling member comprises a second inclined face having a tapered shape and arranged in an opening of the second receptacle.

31. The fuel cartridge coupler of claim 30, wherein the second coupling member comprises a third inclined face having a tapered shape and arranged in an opening of the third receptacle.

32. The fuel cartridge coupler of claim 2, wherein an inner wall surface of the second receptacle is sloped such that an inside diameter of the second receptacle is reduced in a direction toward the first receptacle.

* * * * *